April 19, 1960     H. F. GERWIG ET AL     2,933,106
ELECTRO-HYDRAULIC VALVE
Filed April 1, 1957     3 Sheets-Sheet 1
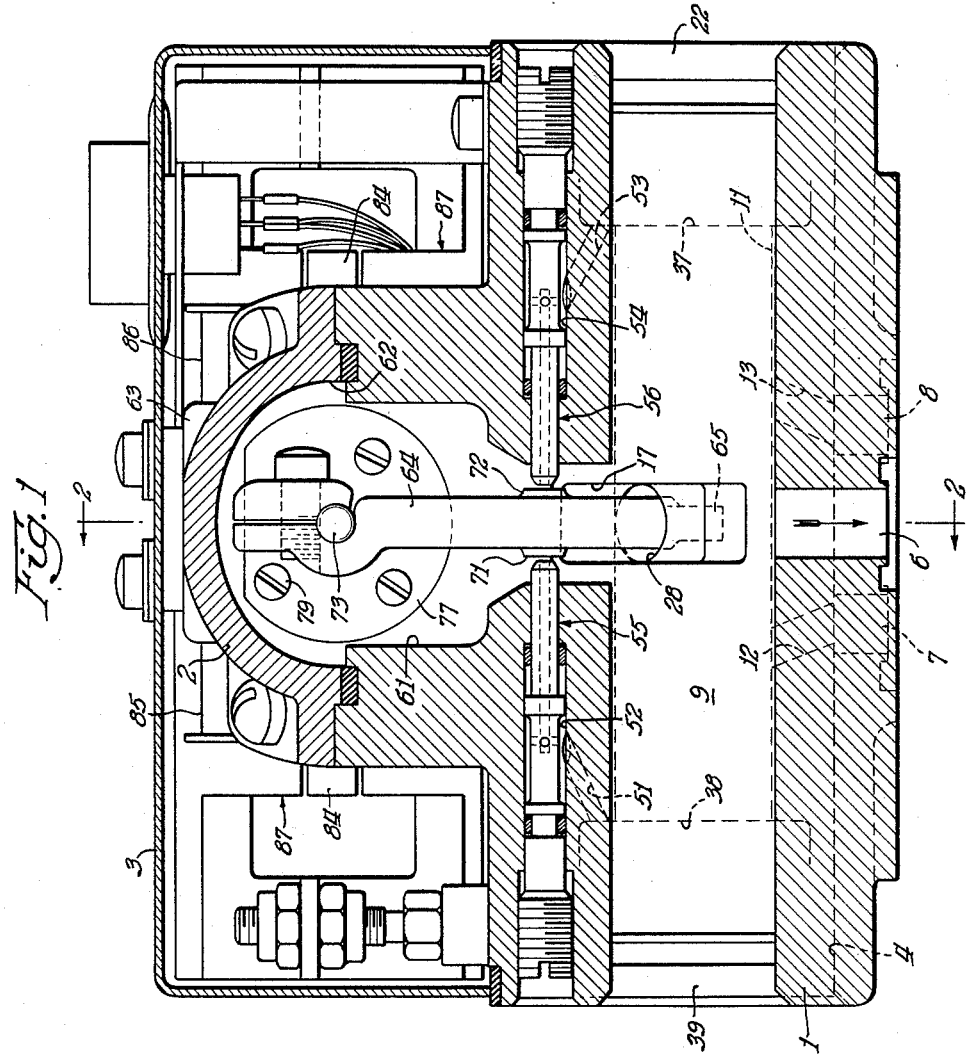
Inventors:
Harvey F. Gerwig
and Robert M. Cox
By: Donald W. Banner Atty.

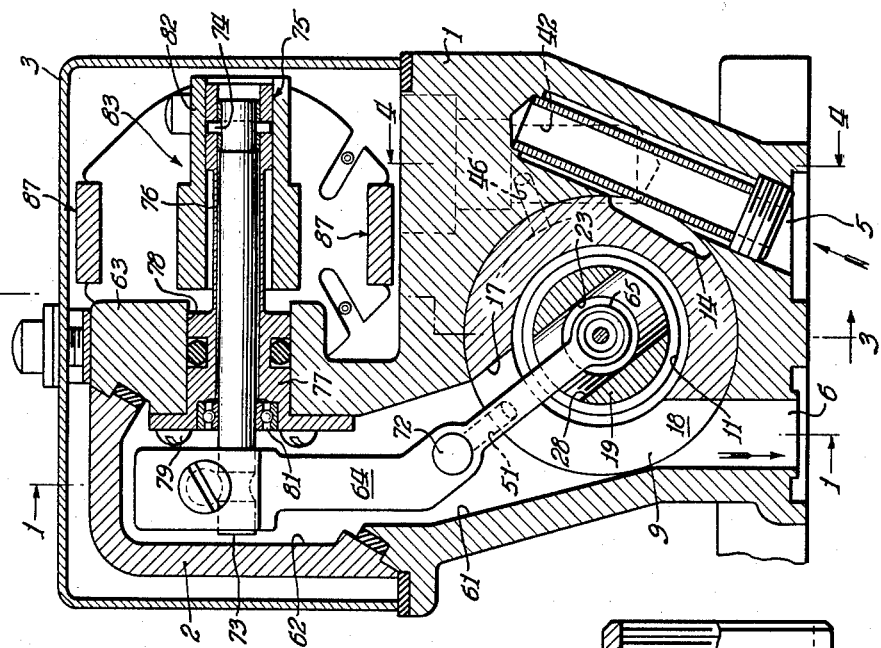

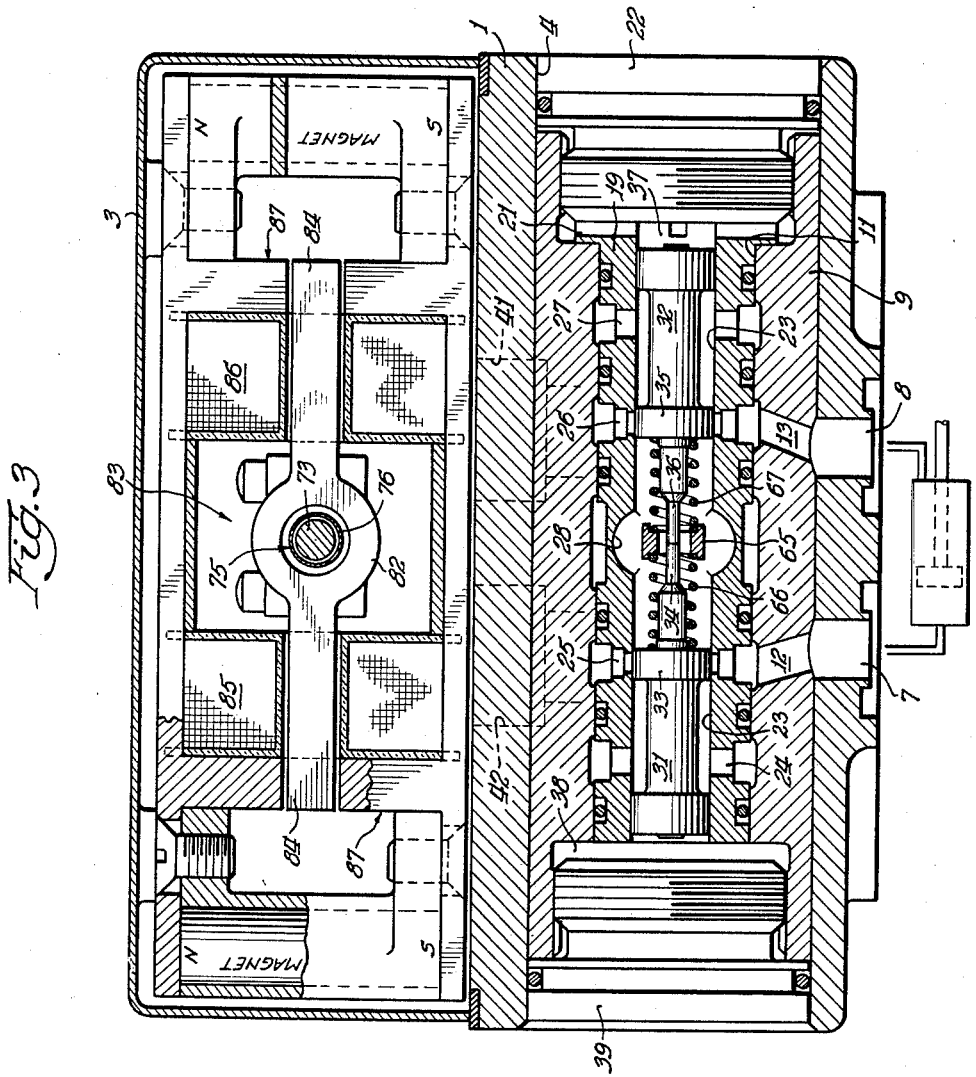

United States Patent Office 2,933,106
Patented Apr. 19, 1960

2,933,106

ELECTRO-HYDRAULIC VALVE

Harvey F. Gerwig, Glendale, and Robert M. Cox, Northridge, Calif., assignors to Weston Hydraulics, Ltd., a corporation of California Application April 1, 1957, Serial No. 649,862

10 Claims. (Cl. 137—623)

This invention relates to electro-hydraulic servo valves, commonly referred to as "transfer valves."

One object of the present invention is the provision of a new and improved transfer valve of a type having an electrically responsive member movable to create a pressure differential at opposite ends of controlling shuttle means, particularly characterized by mechanical means for returning the electro-responsive means to the neutral condition thereof.

Another object is the provision of a device in accordance with the preceding object in which the shuttle means are composed of a plurality of members, means being provided to move the members to a predetermined position upon the failure of system supply pressure which automatically connects the cylinder ports to the "return" system.

Another object is the provision of a device in accordance with the preceding objects in which spring means are interposed between the plurality of members and the electrically responsive member, the spring means preferably being of constant rate of deflection per increment load.

Other objects and features of the invention will be readily apparent to those skilled in the art from the specification and appended drawings illustrating certain preferred embodiments in which:

Figure 1 is a sectional view of a device constructed in accordance with the principles of the present invention, the view being taken substantially along the plane of line 1—1 of Figure 2;

Figure 2 is a sectional view along the plane of line 2—2 of Figure 1;

Figure 3 is a sectional view along the plane of line 3—3 of Figure 2;

Figure 4 is a sectional view along the plane of line 4—4 of Figure 2;

Figure 5 is a detail view, with part broken away, of one of the sleeves employed in the device of Figure 1.

As best illustrated in Figures 1 and 2, the device illustrated comprises a body 1 partially surmounted by an upper member 2 fixed thereto, a cover 3 being carried by the body 1 and enclosing the upper portion thereof as well as the member 2. As illustrated in Figures 2 and 3, body 1 has an elongated, cylindrical bore 4 extending therethrough. Intercepting bore 4, so as to communicate it with the external portion of the body 1, is an input port 5, a return port 6, and cylinder or utilization ports 7 and 8. Shrunk fit within the bore 4 is a tubular sleeve 9, illustrated best in Figure 5. Sleeve 9 has an internal cylindrical bore 11 extending therethrough, the opposite ends of which are enlarged and threaded as illustrated in Figure 5. Communicating the bore 11 with the exterior of the sleeve 9 are ports 12 and 13, respectively in communication with cylinder or utilization ports 7 and 8. As shown in Figures 2 and 5, sleeve 9 is also provided with an elongated slot 14 in its wall in communication with input port 5, ports 15 and 16 being provided in the opposite ends of the slot 14 to communicate it with the bore 11 in the sleeve 9. Sleeve 9 is also provided with an enlarged port 17 intermediate its ends, in communication with a groove 18 in the outer surface of sleeve 9, and which in turn is in communication with return port 6. Each of the other ports in sleeve 9 also is in communication with an associated annular groove in the wall defining bore 11, each of these grooves being separated by lands.

Within the bore 11 in the sleeve 9 there is disposed a second, cylindrical sleeve 19. Sleeve 19 has a flanged end 21, which comprises a plurality of circumferentially spaced, radially extending segments adapted to be clamped between a shoulder formed on the sleeve 9, as illustrated in Figure 3, and a plug 22 threaded into one end of the bore 11. Sleeve 19 has an internal cylindrical bore 23 extending therethrough. Communicating the bore 23 with the exterior of sleeve 19 are a plurality of groups of longitudinally aligned, radially spaced ports 24, 25, 26 and 27. Ports 24 and 27 are respectively in communication with the grooves associated with ports 15 and 16 in the sleeve 9. Port 25 is in communication with the groove in sleeve 9 which communicates with port 12 therein. Port 26 is in communication with the groove which communicates with port 13 in the sleeve 9. On both sides of each group of ports 24, 25, 26 and 27 the sleeve 19 is provided with land portions having openings in which suitable sealing means are provided which prevent fluid transfer between these ports. Centrally of the sleeve 19 there is provided an enlarged port 28 which (as shown in Figure 2) extends through sleeve 19, and which is hydraulically isolated from adjacent ports 25 and 26 by suitable sealing means, a portion of port 28 being aligned with port 17 in the sleeve 9.

Disposed within the bore 23 in the sleeve 19 are a pair of identically constructed shuttles 31 and 32. Shuttle 31 has an enlarged outer end portion in fluid tight engagement with the bore 23, and spaced inwardly therefrom by a portion of reduced diameter is a land 33; inwardly of the land 33 is a reduced diameter portion terminating in a nose 34. Similarly, the shuttle 32 has an enlarged outer end portion in sealable engagement with the wall of the bore 23; spaced therefrom by a reduced diameter portion is a land 35, inwardly of which is a reduced diameter portion which terminates in a nose 36.

As previously described, the sleeve 19 has a flanged end 21 composed of circumferentially spaced segments; between these segments, as will be more fully described hereinafter, fluid may flow into a chamber 37 at the end of the shuttle 32. In the opposite end portion of the sleeve 9 is formed a chamber 38 formed in part by a plug 39 threadably secured to the associated end of the sleeve 9; it will be apparent from Figure 3 that fluid in chamber 38 engages the associated end of the shuttle 31.

Body 1, as best illustrated in Figure 4, is further provided with a spaced pair of vertical openings 41 and 42, respectively closed by suitable plugs. Within the opening 41 there is disposed a suitable filter and pressure reducing assembly 43, and within the opening 42 there is provided a comparable filter and pressure reducing assembly 44.

The assemblies 43 and 44 each comprise body portions in sealed relation to the wall of the associated opening, the body portions respectively having central, longitudinally extending openings therein. The body portions respectively have their inner ends closed by end caps. The end caps have minute lateral openings communicating with the central body openings, and annular filters surround the end cap portions having these minute openings. The body portion of assembly 43 has minute, lateral openings near the outermost portion thereof communicating the central opening of this assembly with an outer portion of opening 41. Similarly, the body portion of assembly 44 also has minute, lateral openings near the outermost portion thereof, these openings communicating the central opening in assembly 44 with an outer portion of opening 42. The aforementioned minute openings in the body portions and end caps of assemblies 43 and 44 are preferably of the order of 0.008 inch. The assemblies 43 and 44 will allow a limited amount of fluids to pass, and in addition will create a substantial pressure drop. For example, it has been found desirable in certain installations to utilize a main source having a pressure of 3000 p.s.i. and reduce that pressure to about 500 p.s.i. by the assemblies 43 and 44. The innermost ends of openings 41 and 42 are in fluid communication with the slot 14 in sleeve 9. The outer portion of opening 41 communicates with a passage 45 which extends through the body 1 and a portion of the sleeve 9 to communicate with the space between the segments on the flanged end 21 of the sleeve 19 so as to be in communication with the chamber 37 at the outermost end of the shuttle 32. Similarly, an outer portion of the opening 42 communicates with a passage 46 which extends through the body 1 and the sleeve 9 and which is in communication with the chamber 38 at the outermost end of the shuttle 31.

The chamber 38 is further in communication with a slanted passage 51 (Fig. 1), extending through the body 1 and the sleeve 9, which communicates with an opening 52 in the body 1. Similarly chamber 37 is in communication, through the space between the segments on the flanged end 21 of the sleeve 19, with a slanted passage 53 in the body 1 and sleeve 9 which, in turn, communicates with an opening 54 in the body 1, as illustrated in Figure 1. In opening 52 is disposed a nozzle assembly 55 having passageways formed therein permitting fluid flow from the opening 52 toward the center of the valve. Similarly, in opening 54 is a second nozzle assembly 56 having passageways therein permitting fluid flow from the opening 54 outwardly of the nozzle assembly 56 toward the center of the valve. Both the nozzle assemblies 55 and 56 have an elongated inner portion extending through complementary openings in the body 1, both terminating with flat nose portions as illustrated in Figure 1.

As best illustrated in Figures 1 and 2, the body 1 is provided with a central opening 61 extending vertically therein which is in communication with the port 17 in the sleeve 9, and which also is in communication with an opening 62 (which is in effect an extension of opening 61), defined by the upper member 2 and a projection 63 formed integral with the body 1. As illustrated in Figure 2, suitable sealing means are provided between the upper member 2 and the body 1, and between the upper member and the projection 63, to prevent fluid leakage between the members. Within this opening 61—62 is a clapper 64. As shown in Figures 2 and 3, the innermost end 65 of the clapper 64 is generally circular in configuration and has a generally circular opening therein through which the nose portions 34 and 36 of shuttles 31 and 32, respectively, may extend. A constant rate spring 66 is disposed between the clapper end 65 and the land 33 on the shuttle 31. A matching constant rate spring 67 is disposed between the clapper end 65 and the land 35 on the shuttle 32. As illustrated in Figures 1 and 2 the clapper 64 is generally V-shaped and is provided intermediate its ends with circular flanged portions 71 and 72 at opposite sides thereof, respectively contiguous the nozzle assemblies 55 and 56. The uppermost end of clapper 64 is fixedly mounted by suitable means to one end of a rod 73.

The innermost end of rod 73 has an opening therein which receives a pin 74 serving to fix that end of the rod 73 to a torque tube assembly 75. The assembly 75 comprises an end portion, as previously described, fixedly attached to the rod 73; a thin walled central, fluid impervious, torsionally flexible portion 76, of metal such as beryllium-copper, spaced from the rod 73; and a sealing portion 77, circular in cross section, which extends through a suitable circular opening 78 in the projection 63 on the body 1. Sealing means are disposed between the side of the opening 78 and the portion 77 to prevent passage of fluid therebetween. The portion 77 is fixedly mounted to the projection 63 on the body 1 by suitable means, such as screws 79, bearing means 81 being disposed between the outermost portion of portion 77 and the rod 73.

Fixedly attached to the innermost end (to the right in Figure 2) of the torque tube assembly 75 is an armature 82 of magnetic material, which is a portion of a torque motor, indicated in general by the numeral 83, preferably designed to produce an output torque linear with respect to its input current. Armature 82 is generally T-shaped, having an enlarged end portion from which project arms 84, as illustrated in Figure 3. Surrounding the arms 84 are electro-magnetic coils 85 and 86 respectively, mounted upon frame means 87 of electro-magnetic material comprising a pair of pole pieces. As will be apparent to those skilled in the art, selective energization of the coils will effect either clockwise or counterclockwise rotation of armature 82 (due to the magnetic field produced by the permanent magnets between the pole pieces), in the view of Figure 3, which will be transmitted through the torque tube assembly 75 to the rod 73 which, in turn, will effect rotation of the clapper 64. Inasmuch as one end of torque tube assembly 75 is rotated while the other end thereof is fixed, this action will occur concurrently with flexure of the torsionally flexible central portion 76 of the torque tube assembly 75.

It will be noted that the coils, and the lead-in wires thereto, are isolated from the clapper, sleeves, and shuttles so that no hydraulic fluid may come into contact with the electrical and magnetic components. The body 1 and the cover 3 define an air chamber in which these electrical and magnetic components are disposed, which is at all times fluid free.

The drawings indicate the condition of the device when it is connected to a suitable hydraulic circuit which supplies fluid thereto and the coils 85 and 86 are equally energized.

Hydraulic fluid under substantial pressure is supplied to the input port 5 which, as shown in Figure 2, may be provided with a suitable filter. The fluid passes into elongated slot 14 in the sleeve 9; part of this fluid passes through ports 15 and 16 (Figure 5) in the sleeve 9 respectively aligned with ports 24 and 27 in sleeve 19 (Figure 3), so that the fluid under high pressure will flow into the cylindrical bore 23 in the sleeve 19 and be retained in those portions of the bore between the outer end of shuttle 31 and the land 33 thereon and between the outer end portion of shuttle 32 and the land 35 thereon. Another portion of the fluid in slot 14 will pass into the inner ends of openings 41 and 42 (Figure 4); this fluid will be filtered and will flow outwardly from the openings 41 and 42 at a reduced pressure into the passages 45 and 46, respectively. As previously described, passage 45 is in communication with end chamber 37 (Figure 3), while end chamber 38 is in communication with the passage 46 so that hydraulic fluid at a pressure substantially reduced from that of the source will fill these chambers 37 and 38.

Before the pressurized fluid enters into the chambers 37 and 38, the shuttle 31 is biased by the spring 66 to the left (Figure 3) until the boss on its outer end engages the plug 39. Similarly, the spring 67 biases the shuttle 32 outwardly until the boss on its outer end engages the plug 22. When fluid fills chambers 37 and 38, however, the pressure of this fluid effects inward movement of the shuttles 31 and 32 to the position illustrated in Figure 3, in which noses 34 and 36 are in direct contact, against the bias of the springs 66 and 67. The pressure in chambers 37 and 38 is identical, and inasmuch as the areas of the outer end faces of the shuttles 31 and 32 are identical the pressure force on the shuttles 31 and 32 is also identical.

As illustrated in Figure 1, chamber 38 is in communication with the passage 51 which carries fluid from chamber 38 into an opening 52. Chamber 37 is in communication with a passage 53, identical with passage 51, which carries fluid into the opening 54. The fluid in opening 52 passes through the nozzle assembly 55 and out the inner, blunt end portion thereof impinging upon the circular flanged portion 71 on the clapper 64. Similarly, fluid in opening 54 passes through the nozzle assembly 56 and out the inner, blunt end thereof impinging upon the circular flanged portion 72 on the clapper 64. Thereafter this fluid passes through port 17 in sleeve 9, and thence to the return port 6. It should be noted that the aforementioned constant flow will purge the system of any air so that, regardless of the fact that the valve may be tilted or inverted, its complete linearity of operation will be preserved.

The coils 85 and/or 86 may be energized to effect rotation of armature 82 in either a clockwise or counterclockwise direction. Assuming that this energization is such to effect clockwise rotation of armature 82, the right end of torque tube assembly 75 (Figure 2) and the right end of rod 73 will be rotated with the armature 82. As previously described, rotation of this portion of the torque tube assembly 75 is effected against the bias of the portion 76 thereof. This rotation of rod 73 effects rotation of clapper 64, fixedly attached to the rod 73. As shown in Figure 1, the flanged portion 71 of the clapper 64 will be moved toward nozzle assembly 55, the lowermost end portion 65 of clapper 64 being moved against the bias of spring 66. As portion 71 approaches nozzle assembly 55, it will impede the normal flow of fluid out of this nozzle assembly so that the pressure in opening 52, passage 51 and chamber 38 will increase. Conversely, as clapper 64 is moved in this assumed direction, flanged portion 72 thereon will be moved further away from the end of nozzle assembly 56 so that fluid may pass outwardly from this nozzle assembly more freely whereby the pressure of the fluid in opening 54, passage 53 and chamber 37 will be reduced below that normally experienced therein. As shown in Figure 3, when the pressure in end chamber 38 increases, while the pressure in end chamber 37 decreases, shuttle 31 will be moved toward the right, the nose 34 thereon transmitting this movement to the nose 36 of the shuttle 32 which also is moved to the right an equal amount. The degree of movement of the shuttles 31 and 32 is determined by the state of electrical energization of the coils 85 and 86 which control the amount of torque applied to shaft 73 or the force required at 65 on clapper 64 to balance this torque produced about the centerline of shaft 73 and thus return clapper 64 to a "null" position. The force at 65 is produced by the displacement of shuttles 31 and 32 acting on the springs 66 and 67 causing them to produce a bias on 65. There is a small residual differential pressure between chambers 37 and 38 to hold the bias of the springs 66 and 67. It should be noted that inasmuch as the force of torque motor 83 is linear with input current thereto, and the pressure differential across the shuttles is linear with respect to clapper 64 position, and that the force of feed back springs 66 and 67 is linear with respect to shuttle position, that the position of the shuttles will be linearly proportional to the torque motor input current.

It should be noted that the circular aperture in clapper end 65 is sufficiently large to permit movement of shuttles 31 and 32 without in any way being directly engaged thereby. Simultaneously the clapper 64 has an infinitely small displacement from absolute neutral which is present only when the shuttles have reached the required position whereas under transient dynamic conditions the clapper will have larger displacement causing greater differential pressures in chambers 37 and 38 to produce motion of shuttles 31 and 32. The shuttles will then be in a position to effect a desired degree of communication between the port 24 (Figure 3) in sleeve 19, connected as previously described to the high pressure fluid source, and the cylinder or utilization port 7, which typically may be connection to one side of a double acting piston. As a result this high pressure fluid will pass into this one side of the double acting piston. The opposite side of the double acting piston is connected to the cylinder or utilization port 8, and as the piston is moved fluid may exhaust from this opposite side through the cylinder or utilization port 8, port 13 in the sleeve 9, port 26 in sleeve 19, flowing out of this sleeve through port 28, into groove 17 in sleeve 9 and through the return port 6. As a result of this equalized position of clapper 64 relative to nozzle assemblies 55 and 56, the pressure in the end chambers 37 and 38 is once again equalized. The shuttles 31 and 32 will remain in their displaced condition. If the coils 85 and 86 are once again returned to their normal condition of energization, the spring 66 will bias the clapper 64 and reverse the above procedure centering the shuttles 31 and 32 as illustrated in the drawings (Figure 3), in which position the communication of cylinder port 7 with the high pressure fluid which had been flowing through port 24 is interrupted, thereby disconnecting the double acting piston from the high pressure source. Thus the land 35 on shuttle 32 interrupts communication between cylinder port 8 and port 26 in the sleeve 19, disconnecting the double acting piston from the return port.

Obviously the coils need not be returned to their normal condition of energization when the shuttles occupy a displaced condition; the coils manifestly could be energized to effect shuttle movement to a different displaced condition.

From the foregoing description of the construction of the device and its operation in one direction of shuttle movement, the manner in which the device is reversely operated to effect shuttle movement in the opposite direction will be readily apparent to those skilled in the art.

Devices incorporating one aspect of the present invention have a safety feature of importance provided. As will be apparent from a consideration of Figure 3, in the event of hydraulic failure, the pressure in chambers 37 and 38 will almost immediately be reduced; springs 66 and 67 will then immediately effect movement of shuttles 31 and 32, respectively, away from the position illustrated in Figure 3 until their outer ends engage their associated plugs 39 and 22, respectively. In this condition of the device, cylinder or utilization ports 7 and 8 are both connected, through ports 12 and 13 respectively, to the central portion of the bore 23 in sleeve 19 which is in communication with the return port 6. As a result, free movement of the double acting piston connected to the ports 7 and 8 is permitted.

It will be seen that the present invention provides devices which also have improved linearity characteristics. Clapper 64 moves in response to coil energization, effecting a desired pressure differential between the opposite ends of the shuttles, the clapper 64 being returned to its central position to once again balance pressures at the opposite ends of the shuttles by mechanical means comprising the springs associated with the innermost end thereof. These springs are directly stressed by the shuttles, so that very accurate neutralization of the clapper is effected as soon as the shuttles are moved to the precise position which effects the desired communication between the controlled double acting piston and the pressure source. Obviously the controlled double acting piston may be moved in either direction and at any desired rate, within the capabilities of the valve.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

What is claimed is:

1. In a transfer valve of the type having a housing formed with fluid inlet and utilization ports, shuttle means movable from a predetermined position to permit fluid flow between the inlet and utilization ports, electrically responsive means movable from a neutral position to effect differences between the fluid pressures at spaced portions of said shuttle means to effect movement thereof and thereby permit fluid flow between the inlet and utilization ports, and resilient means engaging said shuttle means and said electrically responsive means effective to bias said electrically responsive means toward said neutral position thereof upon movement of said shuttle means away from said predetermined position.

2. In a transfer valve of the type having a housing formed with fluid inlet and utilization ports, shuttle means movable from a predetermined position to permit fluid flow between the inlet and outlet ports, electrically responsive means movable from a neutral position to effect differences between the fluid pressures at spaced portions of said shuttle means to effect movement thereof and thereby permit fluid flow between the inlet and outlet ports, and resilient means deformable directly by said shuttle means upon movement thereof in any direction from said neutral position thereof and operable directly on said electrically responsive means to urge said electrically responsive means toward said neutral position thereof upon movement of said shuttle means away from said predetermined position.

3. The device defined in claim 2 in which said shuttle means comprise a pair of shuttles respectively at opposite sides of said electrically responsive means, and in which said resilient means are effective to move said shuttles away from said electrically responsive means to effect fluid communication between certain of the outlet ports upon the occurrence of predetermined pressure conditions.

4. In a transfer valve of the type having a housing formed with fluid inlet and utilization ports, shuttle means movable from a predetermined position to permit fluid flow between the inlet and utilization ports, electrically responsive means movable from a neutral position to effect differences between the fluid pressures at spaced portions of said shuttle means to effect movement thereof and thereby permit fluid flow between the inlet and utilization ports, and resilient means comprising a pair of constant rate springs respectively disposed at opposite sides of said electrically responsive means adapted to engage both said electrically responsive means and said shuttle means and effect movement of said electrically responsive means toward said neutral position thereof upon movement of said shuttle means away from said predetermined position.

5. The device defined in claim 4 in which said shuttle means comprise a pair of shuttles respectively disposed at opposite sides of said electrically responsive means and respectively in engagement with said constant rate springs whereby said springs effect movement of said shuttles away from said electrically responsive means upon the occurrence of predetermined pressure conditions to effect communication between certain of the outlet ports.

6. In a transfer valve of the type having a housing formed with fluid inlet and utilization ports, bore defining means in the housing, shuttle means in said bore between the end portions thereof movable from a predetermined position to permit fluid flow between the inlet and utilization ports, electrically responsive means including a movable clapper, fluid passageway defining means in the housing forming a pair of fluid channels in communication with the fluid inlet, one of said pair of channels communicating one end portion of said bore with a point closely adjacent one side of said clapper, the other of said pair of channels communicating the opposite end portion of said bore with a point closely adjacent the opposite side of said clapper, said clapper means being movable from a first portion to increase the fluid pressure in one of said channels and simultaneously decrease the fluid pressure in the other of said channels whereby movement of said shuttle means from said predetermined position thereof is effected, and resilient means simultaneously engaging both said shuttle means and said clapper means effective to urge said clapper means toward said first position thereof upon movement of said shuttle means away from said predetermined position.

7. The device defined in claim 6 in which said resilient means comprise a pair of constant rate springs respectively disposed at opposite sides of said clapper.

8. The device defined in claim 7 in which said shuttle means comprise a pair of shuttles respectively disposed at opposite sides of said clapper and respectively in engagement with said constant rate springs, whereby said shuttles are movable away from said clapper by said springs upon the occurrence of predetermined pressure conditions to effect a desired degree of communication between said utilization ports.

9. In a transfer valve of the type having a housing formed with fluid inlet and utilization ports, bore defining means in the housing, shuttle means in said bore between the end portions thereof movable from a predetermined position to permit fluid flow between the inlet and utilization ports, electrically responsive means including a torque motor and elongated clapper means movable in response to energization of said torque motor extending inwardly of the valve, a flexible seal between said housing and said clapper means effective to isolate said torque motor from said fluid ports, fluid passageway defining means in said housing including a pair of channels respectively connecting opposite end portions of said shuttle means with points closely adjacent opposite sides of said clapper means, said clapper means being movable by said torque motor from a first position to increase the fluid pressure in one of said channels and simultaneously decrease the fluid pressure in the other of said channels whereby movement of said shuttle means away from said predetermined position thereof is effected, and resilient means engaging said shuttle means and clapper means operable upon movement of said shuttle means away from said predetermined position in either direction to urge said clapper means toward said first position thereof.

10. The transfer valve defined in claim 9 in which said torque motor is disposed adjacent a top portion of the valve, in which said elongated clapper means has a first end portion adjacent said torque motor, in which said elongated clapper means has an intermediate portion adjacent said points which are in communication with opposite end portions of said shuttle means, and in which the other end portion of said elongated clapper means is engaged by said resilient means.

References Cited in the file of this patent

UNITED STATES PATENTS

| | | |
|---|---|---|
| 1,173,038 | Roschanek | Feb. 22, 1916 |
| 2,615,302 | Camerota | Nov. 28, 1952 |
| 2,709,421 | Avery | May 31, 1955 |
| 2,733,688 | Badenoch | Feb. 7, 1956 |
| 2,738,772 | Richter | Mar. 20, 1956 |
| 2,767,689 | Moog | Oct. 23, 1956 |
| 2,775,254 | Stanbury | Dec. 25, 1956 |
| 2,790,427 | Carson | Apr. 30, 1957 |
| 2,797,666 | Chubbuck | July 2, 1957 |
| 2,824,574 | Place | Feb. 25, 1958 |
| 2,835,265 | Bradstadter | May 20, 1958 |

FOREIGN PATENTS

| | | |
|---|---|---|
| 492,292 | Germany | Sept. 1, 1926 |
| 246,086 | Switzerland | Dec. 15, 1946 |

UNITED STATES PATENT OFFICE

CERTIFICATE OF CORRECTION

Patent No. 2,933,106                                April 19, 1960

Harvey F. Gerwig et al.

It is hereby certified that error appears in the printed specification of the above numbered patent requiring correction and that the said Letters Patent should read as corrected below.

Column 8, line 2, for "portion" read -- position --.

Signed and sealed this 27th day of September 1960.

(SEAL)
Attest:
KARL H. AXLINE
Attesting Officer

ROBERT C. WATSON
Commissioner of Patents